United States Patent [19]

Inoue

[11] Patent Number: 4,834,861
[45] Date of Patent: May 30, 1989

[54] MEMBRANE ELECTRODE FOR ELECTRODEPOSITION COATING

[75] Inventor: Akito Inoue, Tachikawa, Japan

[73] Assignee: Poly Techs Inc., Tokyo, Japan

[21] Appl. No.: 123,798

[22] Filed: Nov. 23, 1987

[30] Foreign Application Priority Data

Jul. 25, 1987 [JP] Japan .............................. 62-186344

[51] Int. Cl.⁴ ..................... C25D 13/00; B01D 13/02
[52] U.S. Cl. ..................... 204/299 EC; 204/300 EC; 204/301; 204/282; 204/283
[58] Field of Search ............... 204/180.2, 180.7, 180.9, 204/282, 283, 299 EC, 300 EC

[56] References Cited

U.S. PATENT DOCUMENTS

| | | | |
|---|---|---|---|
| 3,419,488 | 12/1968 | Cooke | 204/181 |
| 3,620,955 | 11/1971 | Jones | 204/283 |
| 4,711,709 | 12/1987 | Inoue | 204/282 |

FOREIGN PATENT DOCUMENTS 0307789  4/1930  United Kingdom ......... 204/299 EC
1020910  2/1966  United Kingdom .

*Primary Examiner*—John F. Niebling
*Assistant Examiner*—Kathryn Gorgos
*Attorney, Agent, or Firm*—Sandler & Greenblum

[57] ABSTRACT

A membrane electrode device used as one electrode provided in association with an article to be coated such as a motor vehicle constituting the other electrode in electrodeposition coating widely used in automatic coating film treatment and the like of motor vehicle bodies. This device includes a tubular support membrane support member formed of mesh-like skeleton members, a membrane wound around the outer periphery of this membrane support member, and an electrode provided at the side of the inner surface of the membrane support member at a given interval therefrom. Part of portions of the skeleton members, which are provided in the vertical direction, are raised to some degree outwardly from the other skeleton portions.

23 Claims, 11 Drawing Sheets

MEMBRANE ELECTRODE FOR ELECTRODEPOSITION COATING

BACKGROUND OF THE INVENTION

1. Field of the Invention

This invention relates to membrane electrode devices for electrodeposition coating, and more particularly to a membrane electrode device for electrodeposition coating, in which a tubular membrane support member is used for fixing a membrane for electrodeposition coating.

2. Description of the Prior Art

The electrodeposition coating is broadly divided into two catgories including one is a coating material of the anion type and the other using a coating material of the cation type. Since, in either of these electrodeposition coatings, uniformity and adhesion of the coating on an article to be coated are excellent and the degree of causing pollution is low, they have recently been widely applied to the automatic coating film treatment of motor vehicle bodies and so forth. These coatings for example, have shown themselves to be particularly suitable for use in the prime coating and/or coat finishing coating of metal materials.

Out of the coating materials used in these electrodeposition coatings, as the aforesaid coating material of the anion type, one of which is a carboxyle group adhered to a resin having a molecular weight (MW) of 2000 so as to be water-soluble. While, as the aforesaid coating material of cation type, one, of which is an amino group attached to a resin component of the coating material so as to be water-soluble, is used. On the other hand, even with these water-soluble coating materials, the degrees of ionization after being dissolved in the water are very low. For this, at present, in the case of the coating material of the anion type, an alkaline neutralizing agent such as triethylamine is mixed thereinto. While in the case of the coating material of the cation type, an acidic neutralizing agent such as acetic acid is mixed thereinto. Whereby, in both cases, neutralizing is effected, respectively, to thereby increase the degrees of ionization in the water.

The neutralizing agents are mixed to increasing the degrees of ionization in accordance with the properties of the resin components of the respective coating materials as described above. On the other hand, when the electrodeposition treatment of the articles to be coated advances to decrease the resin component in the solution, the coating material should be successively supplied from the outside. Accordingly, in the aforesaid solution, there is accumulated amine or acetic acid as the neutralizing agent. Whereby a phenomenon such as redissolving of the coated surface or occurrence of pin holes is generated, so that the efficiency of the electrodeposition coating is impaired to a considerable extent. To solve this, as described in Japanese Patent kokoku (Post-Exam. Publn.) No. 22231/1970 for example, such a so-called pH control is performed for increasing the efficiency that, one electrode is separated from the article to be coated, said article being the other electrode, and an aqueous solution by use of an ion-exchange membrane or the like. Further, and amine or acetic acid is osmotically extracted by use of the ion-exchange membrane or the like, thereby preventing the neutralizing agent from increasing in the aqueous solution.

On the other hand, the aqueous solution surrounding the article to be coated in an electrodeposition bath is constantly agitated to increase the efficiency of the electrodeposition, and water for discharging the neutralizing agent on the other electrode's side, which is separated by the flat plate-shaped ion-exchange membrane is continuously supplied from the outside in a very low value though. To accomplish this, high or low alternate pressures are largely and repeatedly applied to both service of the flat plate-shaped ion-exchange membrane at all times.

The aforesaid alternate pressures are generated, even when during a process in which an article to be coated is suspended from a line the article is transferred into and out of a bath, in addition to the time of agitating the aqueous solution for the electrodeposition.

As for changes in the water pressure, in the case of an ion-exchange membrane commonly used such as membrane having a height of about 1 m and a width of about 50 cm), if a change in water pressure of 0.5 kg/cm$^2$ is generated, then, totally, it results in a change in water pressure of 2500 kg, whereby a tensile force of about 8.5 kg/cm is repeatedly applied to a portion, to which the membrane is mounted in a direction perpendicular to a center line (in this case, if a bulge is generated as inclined at about 10° to the center line, then a tensile force of 48 kg/cm in a tangent line of the bulge due to [8.5/sin10°]. For this, the ion-exchange membrane is constantly in a state where part or the whole thereof is flexed, bending and stretching are repeatedly applied thereto, so that such disadvantages often occur that a thin one cannot be used at all, while, even a thick one is damaged in a short period of time (actually, in two or three days). This fact leads to a case where the ion-exchange membrane should be periodically exchanged in a short period of time, whereby such a situation takes place that, in replacing works, preparation of a crane or the like is necessitated, and, in addition, a line of the electrodeposition coating itself should be stopped in operation.

Further, such phenomena occur that impurities permeated through the ion-exchange membrane and impurities in the water adhere to the peripheral surface of the electrode and polarization occurs. Further air bubbles adhere thereto due to the electrolysis of water, and these particles of polarization and air bubbles cannot be removed completely in the conventional trickling-down water feed method. Thus presenting the disadvantage of that the efficiency of electrodeposition is lowered with time. For this reason, in the electrodeposition coating by the membrane electrode method according to the conventional technique, the working efficiency is very low, thereby presenting the disadvantage of an increased cost.

On the other hand, with the purpose of obviating the above-described disadvantages, the inventor of the present invention has proposed a tubular membrane electrode device (Japanese Utility Model Application No. 082002/1982; U.S. patent application Ser. No. 499,818).

This invention related to one electrode provided in association with the article to be coated, which is the other electrode. More specifically, the invention is of such an arrangement "that a membrane is wound around the outer surface of a tubular membrane support member having water permeability and formed of an insulating material, a tubular electrode is provided on the inner surface's side of the membrane support member at a given interval therefrom, and a water way is provided for an electrolyte flowing from the above to the bottom of the inner diameter's side of the tubular electrode, and thereafter, flowing along the outer peripheral surface of the tubular electrode to outside".

However, the membrane electrode device in the conventional example, in which the membrane is wound around the membrane support member, there are some unsolved problems involving the membrane support member.

More specifically, in the above-described electrode device, a cylindrical membrane support member formed of insulating material, wherein a multiplicity of through-holes 50A are formed in as shown in FIG. 18 is commonly used, and the other, wherein a porous member 60 formed by a sintering process is utilized as a base material and finished. In this case, with the one, wherein the multiplicity of through-holes 50A are formed in the cylindrical member 50, in effecting the electrodeposition as shown in FIG. 14, a percentage of lines D of electric force directed from a positive electrode to a negative electrode being obstructed by the cylindrical member 50 for supporting the membrane is high, whereby an effective operating area of the membrane 51 is considerably decreased, thus presenting the disadvantage of that the efficiency of electrodeposition coating is low.

The other one, wherein the porous member formed by the sintering process is utilized, sludge 62 such as iron oxide tends to block spaces formed in the porous cylindrical member 60 for supporting the membrane, which member is complicated in construction as shown in FIG. 19, whereby the effective operating area of the membrane 51 is decreased with time, thereby presenting the disadvantage of that the efficiency of electrodeposition coating is deteriorated with time.

SUMMARY OF THE INVENTION

The present invention has been developed to obviate the above-described disadvantages of the prior art and has as its object the provision of a membrane electrode device for electrodeposition coating, wherein the device is satisfactory in strength, blocking by sludge such as iron oxide is prevented, and such a disadvantage that the efficiency of electrodeposition coating is abruptly decreased with time can be effectively prevented.

To achieve the above-described object, the present invention contemplates a membrane electrode device for electrodeposition coating, comprising: a tubular membrane support member formed of an insulating material and provided over the entire surface thereof with a liquid flow portion; a membrane wound around the outer surface of the membrane support member; and a tubular electrode provided on the inner surface's side of the membrane support member at a given interval therefrom; wherein liquid delivered from one end portion of the membrane support member flows through the inner wall side of the membrane support member, reaches the other end portion and flows to the outside, the membrane support member is formed of a mesh-like skeleton member, part or the whole of portions of this skeleton member, which are provided in the vertical direction, are raised to some degree outwardly from the other skeleton portions, and an angle portion at the forward end of the raised portion is cut away as necessary.

DETAILED DESCRIPTION OF THE EMBODIMENTS

The first embodiment of the present invention will hereunder be described with reference to FIGS. 1 to 14.

Figure 1:
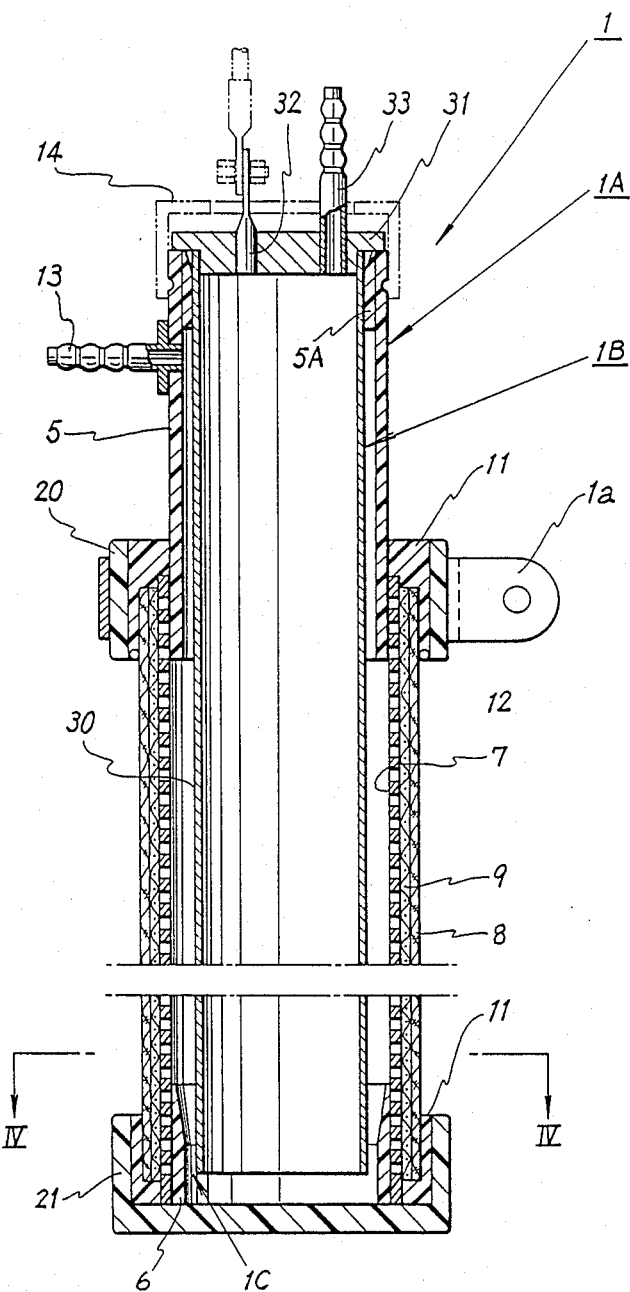
FIG. 1 is a sectional view showing one embodiment of the present invention.

In these drawings, designated at 1 is a membrane electrode device as one electrode provided in an aqueous solution W for electrodeposition coating in association with an article 2 to be coated (Refer to FIG. 14) as the other electrode. As shown in FIG. 1 this membrane electrode device 1 includes a body portion 1A, an electrode portion 1B and a water passing mechanism 1C comprising a gap or the like interposed therebetween.

The body portion 1A is constituted by a first and a second insulating tubes 5 and 6, which are provided at a given interval on the same axis, a relatively rigid membrane support member 7 for connecting the insulating tubes 5 and 6 to each other, a membrane 9 wound around the outer periphery of this membrane support member 7, and an outer cloth 8 further wound around the outer periphery of this membrane 9. As this outer cloth 8, one made of chemical fibers or the like for example, having satisfactory durability to a tensile force, and being water-permeable is used.

As will be described hereunder, the membrane support member 7 is of a non-conductive mesh-like member and formed into a relatively long tubular form, and connected to the first and second insulating tubes 5 and 6 at the inner diametral sides of the opposite end portions thereof.

The membrane 9 is formed of an ion-exchange membrane having a selective permeability to ions attracted by the electrode portion 1B. Incidentally, this membrane 9 may be formed of a neutral membrane, i.e. one having no selectivity, preventing relatively large molecules from being permeated therethrough, and allowing small molecules to permeate therethrough, in addition to the ion-exchange membrane. Since this ion-exchange membrane (or the neutral membrane) is wound around the membrane support member 7 as the membrane 9, the membrane is in a state where the mechanical strength against an external pressure is increased to a considerable extent.

Further, the outer cloth 8 is spirally wound around the outer peripheral surface of this membrane 9 over the entire area as described above, so that satisfactory strength against an internal pressure is provided.

As shown in FIG. 1, a first and a second frame bodies 20 and 21 are provided at a given interval on the outer peripheries of the opposite end portions of the membrane support member 7 wound therearound with the membrane 9 and the outer cloth 8 and, at the same time, the inner diametral sides of these frame bodies 20 and 21 are filled up with potting material 11, so that the insulating tubes 5, 6, the membrane support member 7, the membrane 9 and the outer cloth 8 are simultaneously and firmly integrated with one another. In this case, the first frame body 20 is formed into a tubular form, and, in order to prevent the potting material 11 from flowing out before being solidified flowing out, a ring member 12 is provided in the first frame body 20.

The second frame body 21 is formed into a tubular form having a bottom, into which potting material 11 is filled in a state where the membrane support member 7, the insulating tube 6 and the like are inserted into the second frame body 21 as described above, and all of the above members are simultaneously and integrally fixed to one another.

In this embodiment, as the potting material 11, epoxy resin is used. However, urethane resin, phenol resin or the like may be used as well.

In this embodiment, as the first and second insulating tubes 5 and 6, rigid tubes of vinyl chloride resin are used. Out of these tubes, as shown in FIG. 1, the first insulating tube 5 is provided with a water discharge portion 13 and detachably provided at the top end portion thereof with a cap 14. Designated at 5A is a spacer secured to the inner diametral side of the top end portion of the insulating tube 5.

On the other hand, the electrode portion 1B is constituted by a tubular electrode 30 made of stainless steel, a metallic lid member 31 provided at the top end portion thereof shown in FIG. 1, for suspendingly engaging the electrode, a connecting terminal 32 for a power source and a water feed portion 33. Out of these, the outer diameter of the tubular electrode 30 is further smaller than the inner diameter of each of the insulating tubes 5 and 6 of the body portion 1A. For this, mounting to the body portion 1A of the tubular electrode 30 and demounting therefrom are easily performed, and a portion of the water passing mechanism 1C is formed between the body portion 1A and the tubular electrode 30. The end edge of the outer periphery of the metallic lid member 31 is raised from the tubular electrode 30, whereby the tubular electrode 30 is engaged with the first insulating tube 5 as shown in FIG. 1. For this, the electrode portion 1B can be very easily inserted into the body portion 1A from the outside, and can be very easily detached to the outside as necessary.

The water passing mechanism 1C is to be used for discharging acetic acid and the like accumulate between the membrane 9 and the tubular electrode 30 to the outside, and specifically, is constituted by the above-described electrode portion 1B and the body portion 1A. More specifically, water as a polar liquid which is caused to flow through the water feed portion 33 of the electrode portion 1B flows down through the tubular electrode 30 as indicated by an arrow in FIG. 13, flows to the outer periphery of the tubular electrode 30 from the bottom thereof, while rising along the outer periphery of the tubular electrode 30, flows at the inner side of the membrane 9, and is forced to flow together with the impurities to the outside through the discharge portion 13.

The aforesaid membrane support member 7 will hereunder be described further in detail.

Figure 2:
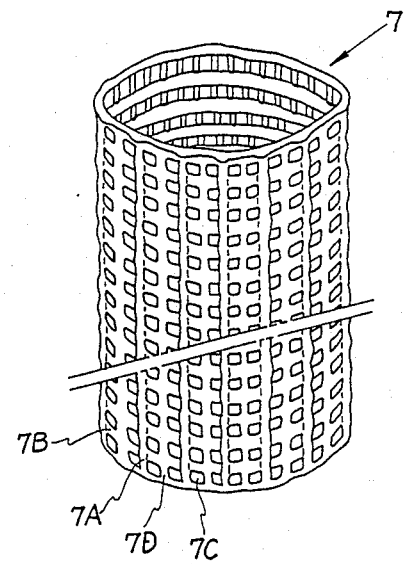
FIG. 2 is a perspective view, partially omitted, showing the membrane support member provided in FIG. 1.
Figure 3:
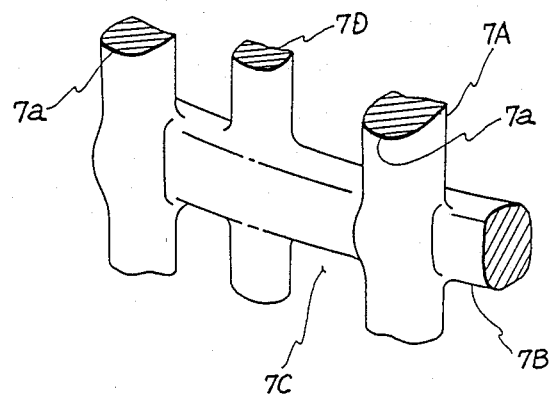
FIG. 3 is an enlarged partially perspective view showing part of the skeleton in FIG. 2.
Figure 4:
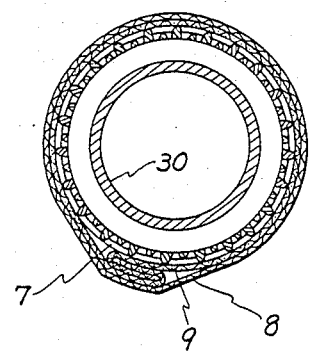
FIG. 4 is a sectional view taken along the line IV—IV in FIG. 1, showing the membrane portion.

As shown in FIGS. 2 and 3, the membrane support member 7 in this embodiment includes relatively long longitudinal skeletons (skeleton portion generally in parallel to the center line) 7A and annular lateral skeletons (skeleton portion positioned generally in a cylindrical shape in a manner to surround the center line) 7B. The longitudinal skeletons 7A are each formed into an elongated shape, and the section thereof is a letter D shape, a flat letter D shape, an elliptical shape, an egg shape or the like. The annular lateral skeleton 7B is formed into a generally round shape, but, may be an elliptical shape or a regular square shape. Thus, the shaped are not limited to predetermined ones.

A plurality of the annular lateral skeletons 7B, 7B, . . . are provided at regular intervals in the longitudinal direction with the respective centers thereof being generally concentric with one another. The longitudinal skeletons 7A, 7A, . . . are provided at regular intervals in a manner to surround the outer peripheries of these annular lateral skeletons 7B, 7B, . . . . Actually, these longitudinal skeletons 7A, 7A, . . . and annular lateral skeletons 7B, 7B, . . . are integrally formed, thereby forming a tubular shape. Outer end faces of the portions being raised in the radial directions of the longitudinal skeletons 7A, 7A, . . . are formed into circularly arcuate outer surfaces 7a. The longitudinal skeletons 7A, 7A, . . . and the annular lateral skeletons 7B, 7B, . . . cross each other, whereby a plurality of openings 7C, 7C, . . . are formed in mesh-like manner. The sectional shape of the tubular form constituted by the longitudinal skeletons 7A, 7A, . . . and the annular lateral skeletons 7B, 7B, . . . is determined by the shape of the annular lateral skeletons 7B, 7B, . . . Thus, the sectional shapes may be various tubular shapes including an elliptical shape, octagonal shape, regular square shape and the like, in addition to the round shape as shown in FIG. 2.

The circularly arcuately raised outer surface 7a of the longitudinal skeleton 7A is a portion coming in contact with the membrane 9 and the like and intended for preventing the outer surface of the membrane 9 from being damaged.

Figure 6:
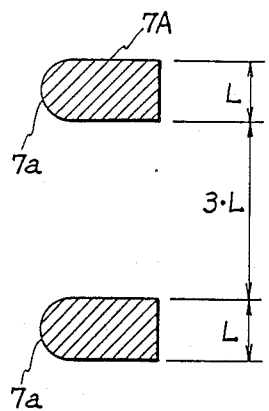
FIGS. 6 to 9 are explanatory views showing portions (raised end portions) of the various skeletons of the membrane support member, respectively.
Figure 7:
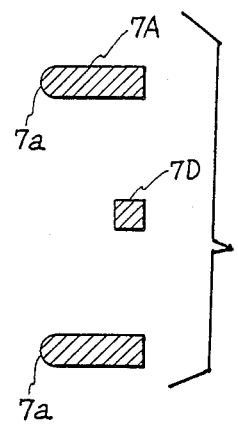
Figure 8:
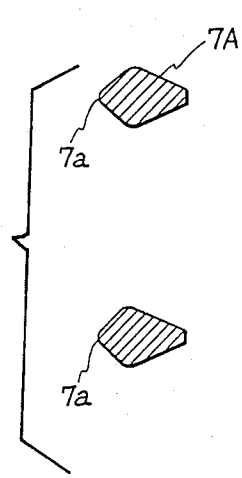
Figure 9:
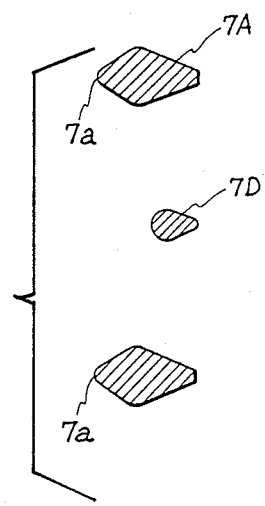

Specifically, in the circularly arcuate outer surface 7a of the longitudinal skeleton 7A, the outer surface of a relatively thick wall section (the outer surface of each of the raised end portions of the longitudinal skeletons 7A, 7A, . . . in the radial directions) is formed into a semicircular shape as shown in FIG. 6, the outer surface of a relatively thin wall section may be formed into a semicircular shape as shown in FIG. 7, and, when the section of the longitudinal skeleton 7A is a generally rhombic shape (a generally elliptical shape) and the outer surface is formed into a triangular shape as shown in FIGS. 8 and 9, although the apex portion is formed into a relatively small circularly arcuate shape, the triangle and the small circularly arcuate shape portion may be formed into the circularly arcuately raised outer surface 7a.

It is ideal that a width (width in the vertical direction, hereinafter referred to as a "skeleton width") of the section of each of the longitudinal skeletons 7A in the circumferential direction of the tubular shape, constituted by the plurality of the longitudinal skeletons 7A; 7A, . . . as described above is made to be a suitable width of about 10 mm or therebelow.

When the section of the longitudinal skeleton is formed into the flat letter D shape of a relatively thin wall section and a space between adjacent longitudinal skeletons 7A and 7A is wide as shown in FIG. 7, intermediate support skeleton 7D may be provided therebetween. Furthermore, when, although the sections of the longitudinal skeletons are of a generally elliptical shape, a letter D shape and the like and, not a particularly flat shape, the space between the adjacent longitudinal skeletons 7A and 7A is wide as shown in FIG. 9, intermediate support skeleton 7D may be provided.

Figure 5:
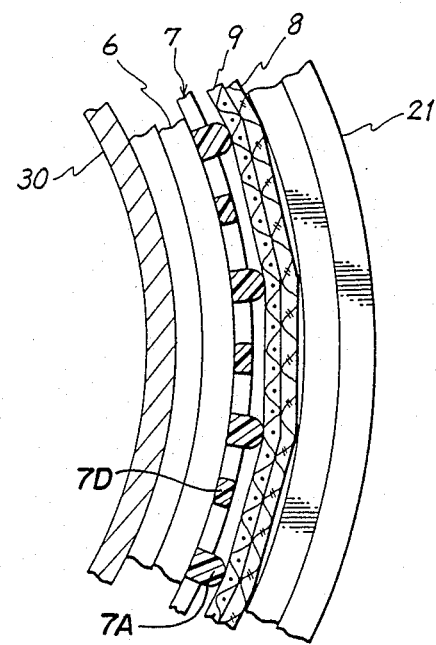
FIG. 5 is an enlarged partially sectional view showing a portion of FIG. 4.

As shown in FIG. 5, this intermediate support skeleton 7D is always formed not to be raised outwardly from the tubular shape of the longitudinal skeletons 7A, 7A, . . . .

The opening 7C may preferably be so widened as not to impair the mechanical strengths of the longitudinal skeletons 7A and the annular lateral skeletons 7B, and it is ideal that the relationship between the opening 7C and the skeleton width of the longitudinal skeleton 7A is represented by an equation $7C = 3 \times L$, where L is the skeleton width (Refer to FIG. 6). An opening width of this opening 7C on the surface of the tubular shape may preferably be widened as much as possible. Furthermore, the surface of the longitudinal skeleton 7A is formed to be smooth so that passage of the lines of the electric force in the aqueous solution for electrode position coating may be performed satisfactorily.

Referring again to FIG. 1 wound around a portion of the frame body 20 at one end of the frame body 1A is a fixture 1a for mounting the frame body 20 to the bath for the electrodeposition coating. The outer cloth 8 wound around the outer surface of the membrane 9 need not necessarily be limited to the cloth-like one, and the outer cloth may be replaced by any other member only if the member is identical in the reinforcing function and the water permeability with the outer cloth. Further, the membrane 9 may be one which is wound spirally on the premise that the joint portion is made waterproof.

The method of fixing the membrane 9 constituting the principal portion of the aforesaid body portion 1A will hereunder be described in detail.

Figure 10:
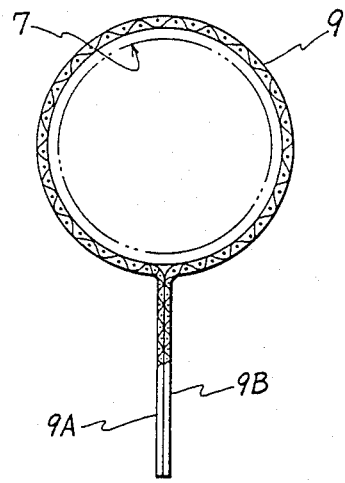
FIGS. 10 to 12 are explanatory views showing examples of the case of winding the membranes around the membrane support member, respectively.
Figure 12:
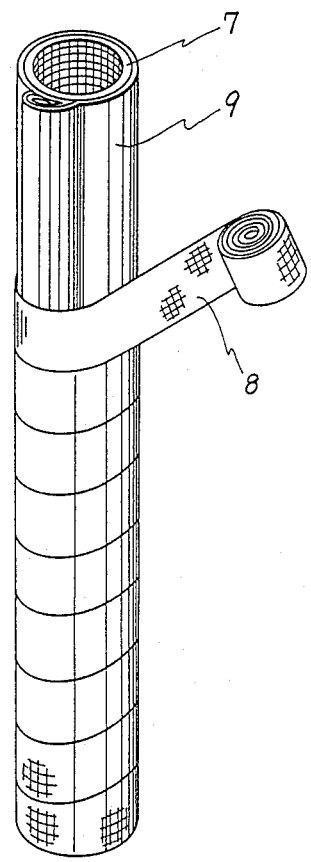
Figure 11:
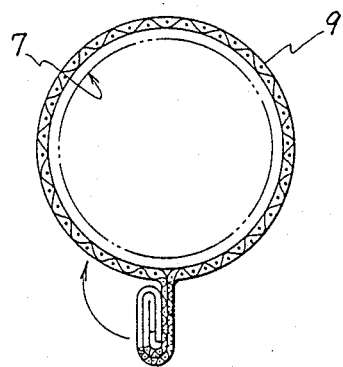
Figure 13:
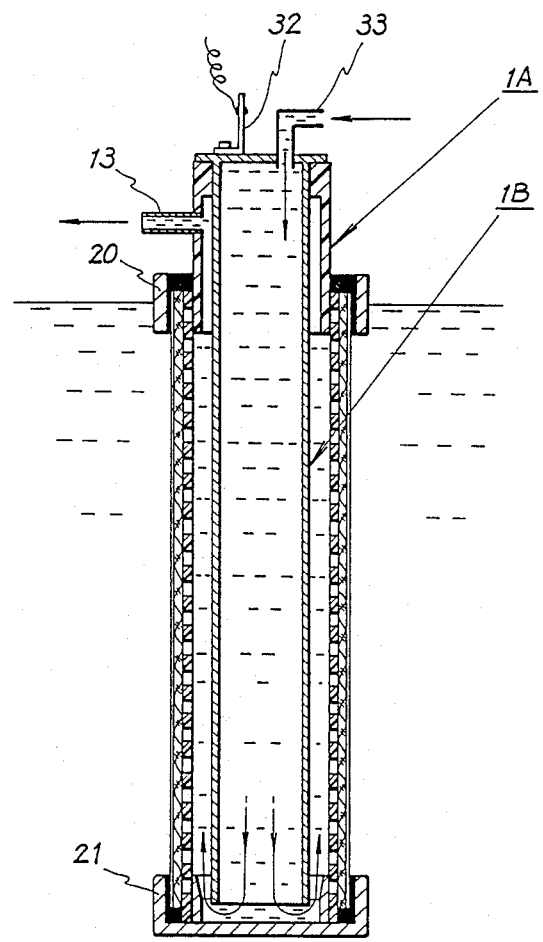
FIG. 13 is an explanatory view showing a water passing mechanism in an actuated position.

First, the membrane 9 is wound around the outer periphery of the membrane support member 7, and end portions 9A and 9B abutted against each other of the membrane 9 are folded or end edges of the membrane 9 after the end portions 9A and 9B are cut away are abutted against each other, whereby the membrane 9 is secured in a generally circular shape as shown in FIGS. 10 and 11. Subsequently, the outer cloth 8 is spirally wound around the outer periphery of this membrane 9 (Refer to FIG. 12), thus completing the integration of the membrane support member 7 with the membrane 9.

Next, the aforesaid first and second insulating tubes 5 and 6 are coupled to the opposite end portions of the cylindrical membrane support member thus formed as shown in FIG. 1, and the first and second frame bodies 20 and 21 are provided on the outer sides of these coupled portions at a given interval as described above. Then, these frame bodies 20 and 21 are filled up with the potting material 11 to be solidified, whereby the body portion 1A is completely integrated.

The whole action of this embodiment when the coating material of cation type is used will hereunder be described.

Figure 14:
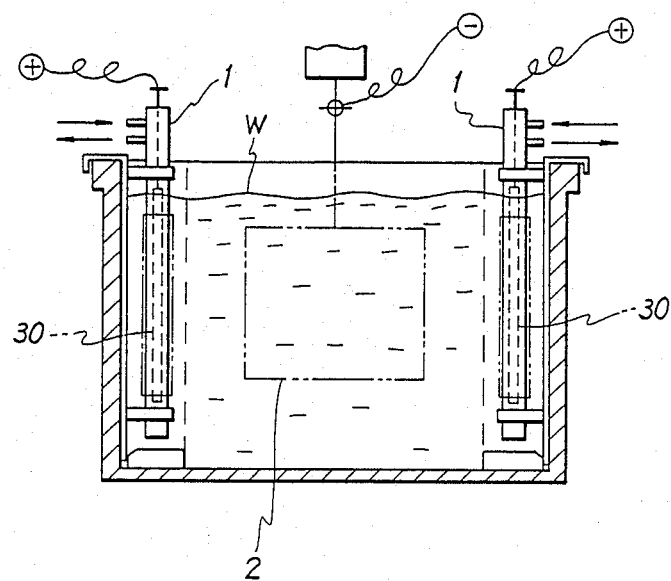
FIG. 14 is an explanatory view showing an example of the case where the membrane electrode device in FIG. 1 is provided in the bath for electrodeposition coating.

First, as shown in FIG. 14, the article 2 to be coated and the membrane electrode device 1 are provided in the aqueous solution W of the coating material of cation type obtained by being neutralized by acetic acid, thereafter, when the article 2 to be coated is turned to be a negative electrode and the tubular electrode 30 of the membrane electrode device 1 is turned to be a positive electrode and a DC voltage is applied, the electrodeposition coating is started at once, the resin component of the coating material having the positive electric charge and colloidal molecules of a pigment move toward the article 2 to be coated as being the negative electrode in the aqueous solution W, adhere to the outer surface of the article 2 to be coated and are discharged, and thereafter, solid matters of the coating material agglomerate to form a coating film. On the other hand, acetic acid having the negative electric charge is accumulated in the aqueous solution W, and this acetic acid starts to move toward the tubular electrode 30 of the membrane electrode device 1 as soon as the start of the aforesaid electrodeposition coating.

Since the coating material of cation type is dissolved in the aqueous solution for electrodeposition for use, as the membrane 9, an anion film (or a neutral film) for easily permeating the molecules of acetic acid having the negative electric charge is used. For this, the molecules of acetic acid attracted by the tubular electrode 30 having the positive electric charge as described above, are easily permeated through the membrane 9 along the lines of the electric force, reaches the tubular electrode 30 from around the tubular electrode 30 and are discharged. In this case, the membrane 9 is the ion-exchange membrane, whereby the membrane 9 has a relatively high impermeability to the neutralizing agent which has been discharged, so that acetic acid is accumulated between the tubular electrode 30 and the membrane 9. On the other hand, pure water, for example, is forced to flow between this tubular electrode 30 and the membrane 9 described above, whereby the accumulated acetic acid and the pure water are continuously discharged to the outside.

As described above, in this embodiment, one electrode provided in association with the article 2 to be coated as being the other electrode is made to be the tubular electrode 30 and the membrane 9 such as the ion-exchange membrane is provided in layers around this tubular electrode 30 via the membrane support member 7 formed of the insulating material, whereby this embodiment can fully stand the aforesaid fluctuations of the external pressure, so that even if the membrane 9 on the same level as in the conventional technique is used, the membrane can be continuously used for a long period of time. Furthermore, such an arrangement is adopted that the water is forced to flow to the portion of the membrane support member 7 from the bottom to the above, whereby the particles of polarization and air bubbles which stagnate around the tubular electrode 30 can be forcedly removed, thus improving the efficiency of the electrodeposition coating to a considerable extent. Further, the neutralizing agent such as acetic acid extracted by the membrane 9 can be discharged at 100% to the outside. As for these respects, with the membrane electrode device of the conventional technique, there has been only such an effect that the neutralizing agent such as acetic acid accumulated around the electrode portion is diluted by the water. Whereas, in this embodiment, the above-described point is improved to a considerable extent, so that the efficiency of extracting the neutralizing agent by the membrane 9 can be notably improved.

The tubular electrode 30 can be easily removed from within the body portion 1A to the outside, so that the maintenance becomes extremely easy, and attachment of a device such as a crane can be advantageously dispensed with. Further, in this embodiment, the outer cloth 8 having the water permeability is wound around the outer periphery of the membrane 9, so that, even with the membrane 9 having a low tensile strength, such an advantage can be offered that the membrane 9 can fully stand the changes in the internal pressure.

The potting material 11 can be uniformly filed up through the agency of the frame bodies 20 and 21, whereby the evenness of strength and uniformity of quality can be obtained, thus reducing the labor for assembling work advantageously.

For this, when a plurality of membrane electrode devices thus formed to function are provided in the aqueous solution W for use, all of the disadvantages caused by the conventional membrane process are obviated. To give an example of the durability of the membrane itself, the membrane can satisfactorily stand the external pressure because the membrane is reinforced by the membrane support member 7. As to the internal pressure, when the inner diameter of the membrane 9 wound in layers is made to be 5 cm, and four of such membranes 9 are used for example, although the total outer surface area of the membranes 9 as a whole is increased as compared with the case of the aforesaid conventional technique, the effect of forming the membrane into the tubular shape works, whereby only a tensile force of about 1.25 kg/cm is applied to each of the membranes 9 along the circumference thereof to a change of 0.5 kg/cm$^2$ in the internal pressure of the membrane electrode device 1. Accordingly, when the membrane 9 having a force of 2 kg/cm standing the tensile force is used, according to the conventional technique, as aforesaid, a change in the tensile force at the portion where the membrane is mounted reaches about 8.5 kg/cm, whereby breakage occurs at once from this membrane mounted portion, whereas, in this embodiment, such an advantage can be offered that the membrane can satisfactorily stand this even with the wound outer cloth 8 not being used.

Further, in the above embodiment, through the agency of the circularly arcuate outer surfaces 7a, formed on the outer end faces of the longitudinal skeletons 7A, 7A, . . . in the radial directions, the lines of electric force moving toward the inner electrode through the membrane 9 can bypass the skeleton members along moderate curves without being shielded by the skeleton members. This has an effect as if the rate of opening of the opening portion 7C were increased.

Further, when the membrane 9, the outer cloth 8 and the like are wound around the membrane support member 7, a portion where the membrane 9 and the longitudinal skeleton 7A are brought into contact comes to be circularly arcuate, the circularly arcuate outer surfaces 7a, 7a, . . . do not damage the outer surface of the membrane 9, thus offering such advantages that the membrane 9 and the outer cloth 8 can be relatively firmly wound around the membrane support member 7.

Further, in this embodiment, the circularly arcuately raised outer surfaces 7a are formed on the outer surfaces of the longitudinal skeletons 7A, 7A, . . . in the radial directions, whereby the longitudinal skeletons 7A, 7A, . . . can expand the areas of the opening portions 7C, 7C, . . . on the outer surface side of the membrane support member 7 at the side outwardly of the center of the membrane support member 7. And, the annular skeletons 7B are located inwardly of the longitudinal skeletons 7A, 7A, . . . , whereby spaces are formed between the membrane and the annular lateral skeletons 7B, so that deposition of sludge due to iron oxide and the like in the polar liquid, which would otherwise occur in the past, can be notably decreased, thus enabling to avoid the disadvantages of causing blocking of the meshes of the membrane due to the deposition of sludge. For this, such a phenomenon can be notably moderated that a satisfactory value of an electric current in the membrane electrode device 1 through the aqueous solution for electrodeposition coating would otherwise be abruptly lowered with time according to the conventional technique, so that continuous use for a longer period of time (according to the experiments, three times or more than that in the past) is possible.

In this embodiment, the plurality of annular lateral skeletons 7B, 7B, . . . are arranged in the longitudinal direction at regular intervals, the plurality of longitudinal skeletons 7A, 7A, . . . are provided around the plurality of annular lateral skeletons 7B, 7B, . . . at regular intervals, and the plurality of longitudinal skeletons 7A, 7A, . . . and the plurality of annular lateral skeletons 7B, 7B, . . . form lattice-shaped opening holes 7C, 7C, . . . , so that the lines of the electric force passing through the membrane 9 can bypass the skeletons and deposition of sludge and the like between the skeletons arranged in the horizontal direction and the membrane can be avoided, thus enabling to hold the effective operating area of the membrane to 90% or thereabove.

Further, the membrane support member 7 as a whole is formed into the tubular shape as described above, and constructed such that the longitudinal skeletons 7A, 7A, . . . and the annular lateral skeletons 7B, 7B, . . . cross each other to form the opening portions 7C, so that such an advantage can be offered that the structural strength of the membrane support member 7 is not deteriorated irrespective of that the plurality of opening portions 7C, 7C, . . . are formed.

Figure 15:
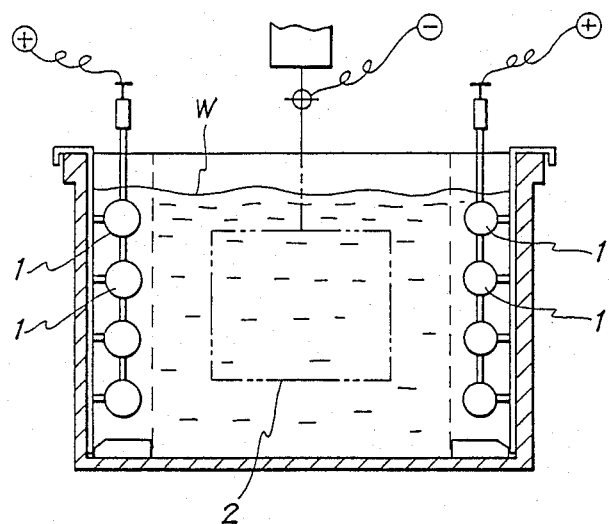
FIG. 15 is an explanatory view showing a second embodiment.
Figure 16:
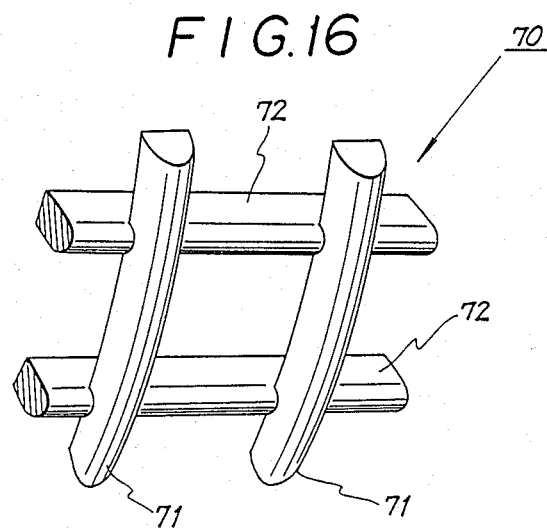
FIG. 16 is an enlarged partially perspective view showing an example of the membrane support member used in the membrane electrode device shown in FIG. 15.
Figure 17:
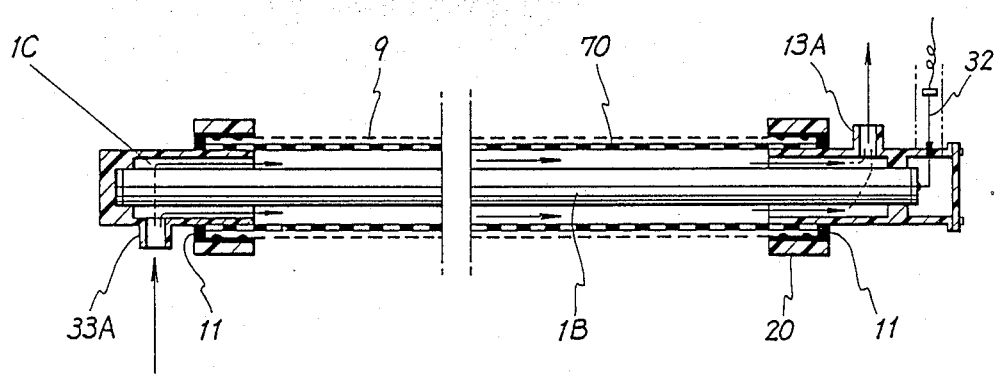
FIG. 17 is a sectional view showing the membrane electrode device, into which the membrane support member shown in FIG. 16 is assembled.
Figure 18:
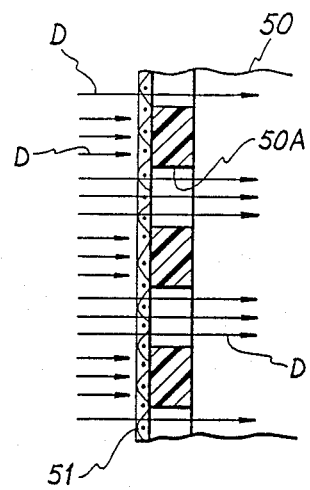
FIGS. 18 and 19 are enlarged partially sectional views showing the membrane support members in the conventional examples, respectively.
Figure 19:
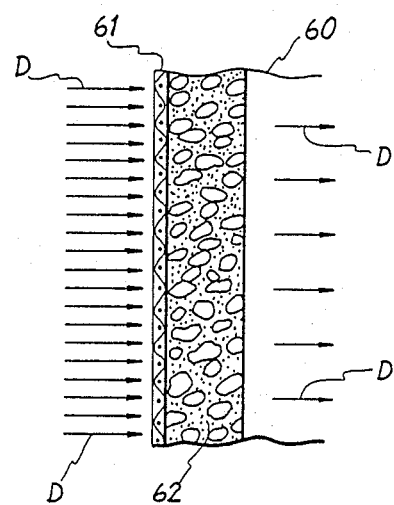

The second embodiment will hereunder be described will reference to FIGS. 15 to 17.

While the first embodiment describes the case where the membrane electrode device 1 are longitudinally provided, this second embodiment explains the case where the membrane electrode devices 1 are laterally provided as shown in FIG. 15.

In this case of FIG. 15, the skeleton of the membrane support member 70 provided in the interior is formed as shown in FIG. 16. More specifically, the outer faces of part or a whole of annular skeleton portions 71, 71, . . . formed in a manner to surround the center line are raised outwardly from portions of straight-lined skeletons 72, 72, . . . which are provided along the center line. The other respects of the arrangement are identical with those in the first embodiment described above.

The water as being the electrolyte flows through a water feed portion 33A to the left in FIG. 17, moves through the interior of the membrane support member 70 in a direction indicated by an arrow, and is discharged to the outside through a water discharge portion 13A to the right in FIG. 17. Even with this arrangement, the functional effect identical with that in the first embodiment described above can be obtained.

Incidentally, as the membrane support member 7 or 70, one in which the skeleton portions cross obliquely may be used.

Figure 20:
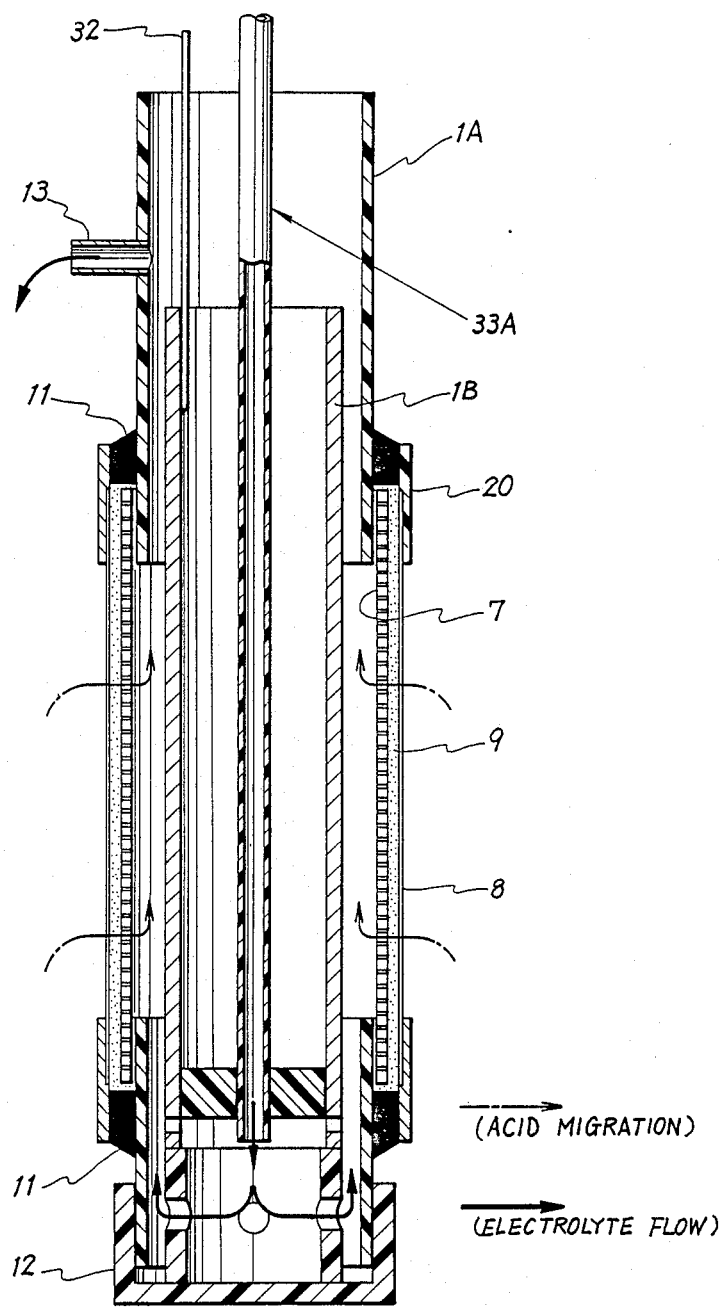
FIG. 20 is a sectional view showing the definition of the above embodiment.

In the above embodiment, such a case has been exemplified that, in the case of the device of the longitudinal type for example, the water as the electrolyte flows in through the top opening of the tubular electrode 30, flows down through the tubular electrode 30, moves toward the outer periphery of the tubular electrode 30 from the bottom, while rising along the outer periphery of the tubular electrode 30, the water moves within the membrane 9, and is forcedly discharged to the outside. However, the present invention need not necessarily be limited to this. For example, as shown in FIG. 20, such an arrangement may be adopted that, as an electrode, pillar-shaped one or elongate plate-shaped one is used, this electrode is provided in a tubular membrane support member in the axial direction thereof, a water introducing pipe is inserted from the top end of the membrane support member and the water is caused to flow through the water introducing pipe from the bottom or thereabout, and is discharged to the outside through a water discharge portion at the top. Or, such an arrangement may be adopted that the water feed portion 33 is provided at the bottom of the membrane electrode device irrespective of the shape of the electrode, the water is supplied from below to above and discharged to the outside through a water discharge portion at the top. Furthermore, in the case of the device of the lateral type, about the same as above may be adopted.

According to the present invention with the above-described arrangement and functions, such an outstanding and unprecedented membrane electrode device for electrodeposition coating can be provided that the membrane support member is formed of the mesh-like skeleton member, and part or the whole of the portions of this skeleton member, which are provided in the vertical direction, are raised outwardly from the other skeleton portions, whereby the effective operating area of the membrane wound around the membrane support member can be set at a relatively high value without lowering the total strength, the value of sludge deposited between the membrane and the membrane support member can be made considerably lower than that in the conventional cases, so that such a disadvantage in the conventional cases that the abruptly lowered efficiency of the electrodeposition coating with time, which has occurred due to the deposition of sludge, can be notably improved.

What is claimed is:

1. A membrane electrode device for electrodeposition coating comprising:
    a tubular membrane support member formed of a mesh of insulating material, said member having an inner surface and an outer surface, said member further having predetermined portions projecting generally radially outwardly from other portions of said member;
    a membrane, said membrane being wound around the outer surface of said membrane support member; and
    an electrode positioned on the inner surface side of said membrane support member, said electrode being spaced a predetermined distance form said support member.

2. A device as recited in claim 1, wherein said tubular membrane support member is formed of a mesh of insulating material having skeleton member portions, some of which portions are generally longitudinally disposed and the remaining which portions are generally laterally disposed.

3. A device as recited in claim 2, wherein the longitudinally disposed skeleton member portions project generally outwardly from the generally laterally disposed skeleton member portions.

4. A device as recited in claim 3, wherein the generally laterally disposed skeleton member portions comprise a plurality of annular lateral skeletons disposed at regular intervals in the longitudinal direction and, further, wherein the generally longitudinally disposed skeleton member portions comprise a plurality of longitudinal skeletons disposed at regular intervals and in such positions so as to surround the outer peripheries of the annular lateral skeletons.

5. A device as recited in claim 4, wherein at least some of said plurality of longitudinal skeletons are each formed into a latter D shape in section.

6. A device as recited in claim 4, wherein the sectional shape of at least some of said plurality of longitudinal skeletons is a generally rhombic shape and the apex portion of the outer surface side of said rhombic shape is formed into a relatively small circularly arcuate shape.

7. A device as recited in claim 2, wherein every other longitudinal disposed skeleton member portion projects generally outwardly from tube generally laterally disposed skeleton member portion.

8. A device as recited in claim 4, wherein said tubular support member further comprises an intermediate skeleton support, said intermediate skeleton support being partially disposed between adjacent longitudinal skeletons.

9. A device as recited in claim 4, wherein the distance between each adjacent longitudinal skeleton is about three times the width of each longitudinal skeleton.

10. A device as recited in claim 1, wherein said tubular member has a center axis and further comprises a plurality a skeleton members, a number of which skeleton members circularly surround the center axis, the remaining skeleton members perpendicularly intersecting each of the number of skeleton members which circularly surround the center axis and, further, wherein at least some of the number of skeleton members which circularly surround the center axis are at least partially raised outwardly from the said remaining skeleton members.

11. A device as recited in claim 10, wherein said number of skeleton members which surround the center axis comprise a plurality of annular lateral skeletons disposed at regular intervals longitudinally and having inner peripheries and, further, wherein said remaining skeleton members comprise a plurality of straight-lined skeletons provided at regular intervals along the inner peripheral of said annular skeleton.

12. A device as recited in claim 11, wherein at least a number of said plurality of annular skeletons are each formed into a letter D shape in section.

13. A device as recited in claim 11, wherein at least a number of said plurality of straight-lined skeletons are formed into a letter D shape.

14. A device as recited claim 1 wherein said tubular membrane support member has an entire surface, which entire surface is adapted to allow liquid to flow over it and; further, wherein said tubular membrane support member forms a water way that controls liquid flow such that liquid delivered at one end of said tubular membrane support member flows through the inner side wall of said support member, reaches the opposing end portion and flows to the outside.

15. A membrane support member comprising:
a plurality of first members; and
a plurality of second members that engage said plurality of first members so as to form a mesh structure wherein said support member further having predetermined portions projecting generally radially outwardly from other portions of said support member.

16. A member as recited in claim 15 wherein said plurality of first members and said plurality of second members are formed from insulating material.

17. A member as recited in claim 16 wherein said plurality of first members are all generally parallel to each other and said plurality of second members are all generally perpendicular to each of said plurality of first members.

18. A member as recited in claim 17 wherein said plurality of first members and said plurality of second members engage so as to define rectangular openings.

19. A member as recited in claim 17 wherein said plurality of first members and said plurality of second members engage so as to define square openings.

20. A member as recited in claim 17 wherein a predetermined number of said plurality of second members is offset from said plurality of first members 21. A member as recited in claim 17 wherein all of said plurality of second members are offset from said plurality of first members.

22. A member as recited in claim 17 wherein every other one of said plurality of second members is offset from said plurality of first members.

23. A member as recited in claim 15 wherein said plurality of second members has a curved surface for engaging a membrane to be supported.

* * * * *

UNITED STATES PATENT AND TRADEMARK OFFICE
CERTIFICATE OF CORRECTION

PATENT NO. : 4,834,861

DATED : May 30, 1989

INVENTOR(S) : Akito INOUE

It is certified that error appears in the above-identified patent and that said Letters Patent is hereby corrected as shown below:

column 1, line 15, change "catgories including" to ——categories including:——;
    column 1, line 16, change "using" to ——is——;
    column 1, line 24, after "and/or" delete "coat";
    column 1, line 31, after "one" delete ",";
    column 1, line 33, delete ", is used";
    column 1, line 44, change "increasing" to ——increase——;
    column 2, line 8, change "service" to ——surfaces——;
    column 2, line 11, after "when" insert ——,——;
    column 2, line 12, after "line" insert ——,——;
    column 2, line 16, change "such as" to ——(such a——;
    column 2, line 43, after "Further" insert ——,——;
    column 2, line 47, after "Thus" insert ——,——;
    column 2, line 60, change "related" to ——relates——;
    column 2, line 63, change " "that a" to ——that "a——;
    column 3, line 11, after "member" insert ——50——;
    column 3, line 13, after "formed" delete "in";
    column 3, line 13, after "18" insert ——,——;
    column 5, line 30, after "solidified" delete "flowing out";
    column 6, line 4, change "accumulate" to ——accumulated——;
    column 6, line 32, change "shaped" to ——shapes——;
    column 7, line 45, after "1" insert ——,——;

UNITED STATES PATENT AND TRADEMARK OFFICE
CERTIFICATE OF CORRECTION

PATENT NO. : 4,834,861

DATED : May 30, 1989

INVENTOR(S) : Akito INOUE

It is certified that error appears in the above-identified patent and that said Letters Patent is hereby corrected as shown below:

column 10, line 60, change "device" to ---devices---;
    column 12, line 9, change "form" to ---from---;
    column 12, line 32, change "latter" to ---letter---;
    column 12, line 54, change "a" to ---of---, after "plurality";
    column 13, line 2, change "peripheral" to ---periphery---;
    column 13, line 2, change "skeleton" to ---skeletons---; and
    column 14, line 17, after "members" insert ---.---.

Signed and Sealed this

Twenty-fifth Day of August, 1992

*Attest:*

DOUGLAS B. COMER

*Attesting Officer*      *Acting Commissioner of Patents and Trademarks*